United States Patent [19]

Halioua

[11] Patent Number: 4,564,295
[45] Date of Patent: Jan. 14, 1986

[54] APPARATUS AND METHOD FOR PROJECTION MOIRE TOPOGRAPHY

[75] Inventor: Maurice Halioua, Port Jefferson, N.Y.

[73] Assignee: New York Institute of Technology, Old Westbury, N.Y.

[21] Appl. No.: 473,057

[22] Filed: Mar. 7, 1983

[51] Int. Cl.$^4$ .................... G01B 11/24; G01B 15/04
[52] U.S. Cl. ................... 356/376; 250/237 G
[58] Field of Search ............... 356/376, 375, 374; 250/237 G

[56] References Cited

U.S. PATENT DOCUMENTS

| 3,627,427 | 12/1971 | Johnson et al. | 356/376 |
| 3,952,150 | 4/1976 | Gerardin et al. | 178/6.8 |
| 4,132,575 | 1/1979 | Suzuki et al. | 156/58 |

FOREIGN PATENT DOCUMENTS

| 2279066 | 2/1976 | France . |
| 2292213 | 6/1976 | France . |
| 2414712 | 8/1979 | France . |
| 0585893 | 3/1977 | Switzerland . |

OTHER PUBLICATIONS

Cline et al., "Computer Aided Surface Reconstruction of Interference Contours", *Applied Optics*, vol. 21, No. 24, 12/15/82, pp. 4481–4487.
Meadows et al., "Generation of Surface Contours by Moire Patterns", Applied Optics, vol. 9, No. 4, Apr. 1970, pp. 942–947.
Wasowski, "Moire Topographic Maps", Optical Communications, vol. 2, No. 7, Dec. 1970, pp. 321–323.
Allen et al., "Removal of Unwanted Patterns from Moire Contour Maps by Grid Translation Techniques", Applied Optics, vol. 10, No. 1, pp. 210–212, Jan. 1971.
Xenofos et al., "Evaluation of Moire Imaging System", Phys. Med. Biol., vol. 24, No. 2, 1979, pp. 262–270.

*Primary Examiner*—R. A. Rosenberger
*Assistant Examiner*—Michael Vollero
*Attorney, Agent, or Firm*—Martin M. Novack

[57] ABSTRACT

The disclosure is directed to an apparatus and method for obtaining an improved moire fringe pattern image of an object. A beam of incoherent light is projected at the object. A grating is disposed in the path of the beam projected at the object, this grating being referred to as a projection grating. Means are provided for focusing the beam reflected from the object to obtain an image at an image plane. Another movable grating is disposed at the image plane. This movable grating is referred to as a reference grating. Means are provided for recording the image at the image plane, the recording means being, for example, a photographic or video camera. In accordance with an important feature of the invention, means are provided for moving the projection grating and the reference grating in synchronism. In a preferred embodiment, the projection and reference gratings are mounted in spaced relation in a movable member, and the synchronized motion of the gratings is implemented by moving the member. In a form of the disclosure, a double-projection set-up is used wherein two projection beams are directed at the object through first and second movable projection gratings, respectively. In this embodiment, the first and second projection gratings are moved in synchronism with the reference grating. This is preferably achieved by mounting the three gratings in appropriate spaced relationship in a common member, and moving the member.

20 Claims, 7 Drawing Figures

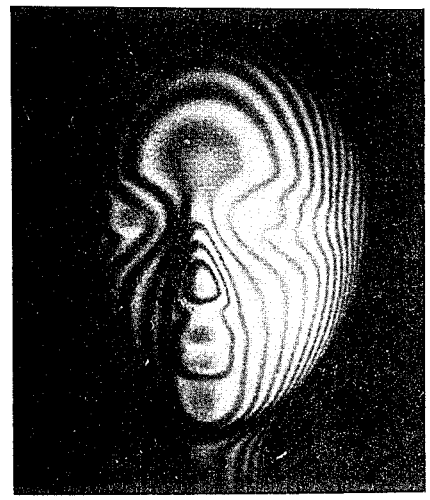
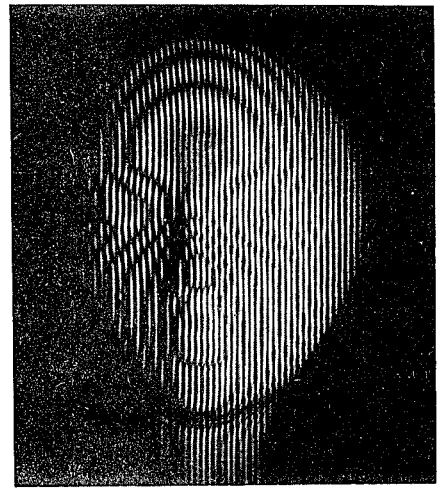
Fig. 2A    Fig. 2B
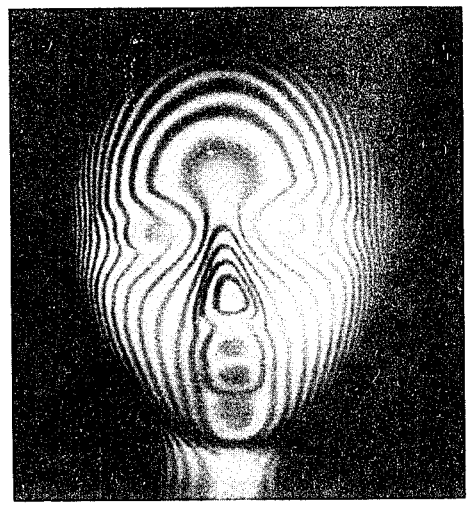
Fig. 4

APPARATUS AND METHOD FOR PROJECTION MOIRE TOPOGRAPHY

BACKGROUND OF THE INVENTION

This invention relates to the determination of the topography of three dimensional objects and, more particularly, to an improved apparatus and method of moire topography.

Moire topographical contouring techniques have become recognized as simple and powerful means of three-dimensional object shape analysis. Both shadow and projection moire methods have been successfully used for various metrological applications including contouring of large objects and living bodies, for obtaining difference in object shapes, and for deflection and vibration analyses. In shadow moire techniques, a single large grating is typically disposed in front of the object, and the illuminating and reflected beams both pass through this grating. In projection moire techniques, the projection beam passes through a first grating, and the deformed version of this grating on the object is imaged at a second grating.

The relative advantages of the two methods have been extensively discussed in the literature and the projection moire method has been shown to generally offer greater flexibility than the shadow moire method.

In order to implement moire topography as a practical tool, recent investigations have been directed towards processing fringe patterns with increasing degrees of automation. Generation and acquisition of fringe data for automated analysis have been attempted using electro-optic, electronic and video techniques. Extensive automated analysis of moire fringes with the aid of digital computers is rather recent, and continuing efforts are being made in this direction.

A typical automated fringe processing scheme involves first digitizing the fringe pattern from a photograph or from an on-line video signal. The digitized picture is then processed, such as on an interactive computer system to detect fringe peaks, assign fringe orders and then plot the results. Fringe peak detection algorithms generally depend on the interrogation of the intensity values of the picture and are thus greatly affected by undesirable noise in the pattern.

Moire patterns have inherent noise due to the original gratings, especially when coarse gratings are used. Topographical fringes, in addition, are often plagued by spurious moire in the regions of large slopes. It has long been recognized that in a shadow moire arrangement, these artifacts can be eliminated by a grating translation technique. (J. B. Allen and D. M. Meadows, Appl. Opt. 10(1), 210 (1971), and J. Wasowski, Opt. Commun. 2, 321, (1970)). It has also been analytically shown (e.g. by Allen et al.) how these unwanted patterns disappear by photographic integration.

It is an object of the present invention to improve the quality of the moire patterns obtained in projection moire systems.

SUMMARY OF THE INVENTION

The present invention is directed to an apparatus and method for obtaining an improved moire fringe pattern image of an object. In accordance with an embodiment of the apparatus of the invention, means are provided for projecting a beam of radiation at the object. A grating is disposed in the path of the beam projected at the object, this grating being referred to as a projection grating. Means are provided for focusing the beam reflected from the object to obtain an image at an image plane. Another movable grating is disposed at the image plane. This movable grating is referred to as a reference grating. Means are provided for recording the image at the image plane, the recording means being, for example, a photographic or video camera. In accordance with an important feature of the invention, means are provided for moving the projection grating and the reference grating in synchronism.

In a preferred embodiment of the invention, the projection and reference gratings are mounted in spaced relation in a movable member, and the synchronized motion of the gratings is implemented by moving the member. In a form of the invention, a double-projection setup is used wherein two projection beams are directed at the object through first and second movable projection gratings, respectively. In this embodiment, the first and second projection gratings are moved in synchronism with the reference grating. This is preferably achieved by mounting the three gratings in appropriate spaced relationship in a common member, and moving the member.

The present technique, with its more precise fringe patterns, is particularly well suited for computer-assisted moire fringe pattern analysis. Some of the steps that are generally required to process noisy fringes can be eliminated. Applications are evident in robotic vision, computer graphics, and bio-medical metrology, as well as other fields.

Further features and advantages of the invention will become more readily apparent from the following detailed description when taken in conjunction with the accompanying drawings.

BRIEF DESCRIPTION OF THE DRAWINGS

FIG. 2 includes FIGS. 2A and 2B which respectively illustrate stationary grating fringes obtained from a projection moire set-up with a mannequin object, and fringes obtained with the same set-up using moving gratings.

FIG. 4 illustrates the type of moving grating projection moire pattern which is obtained using the system and method of FIG. 3.

DESCRIPTION OF THE PREFERRED EMBODIMENTS

Figure 1:
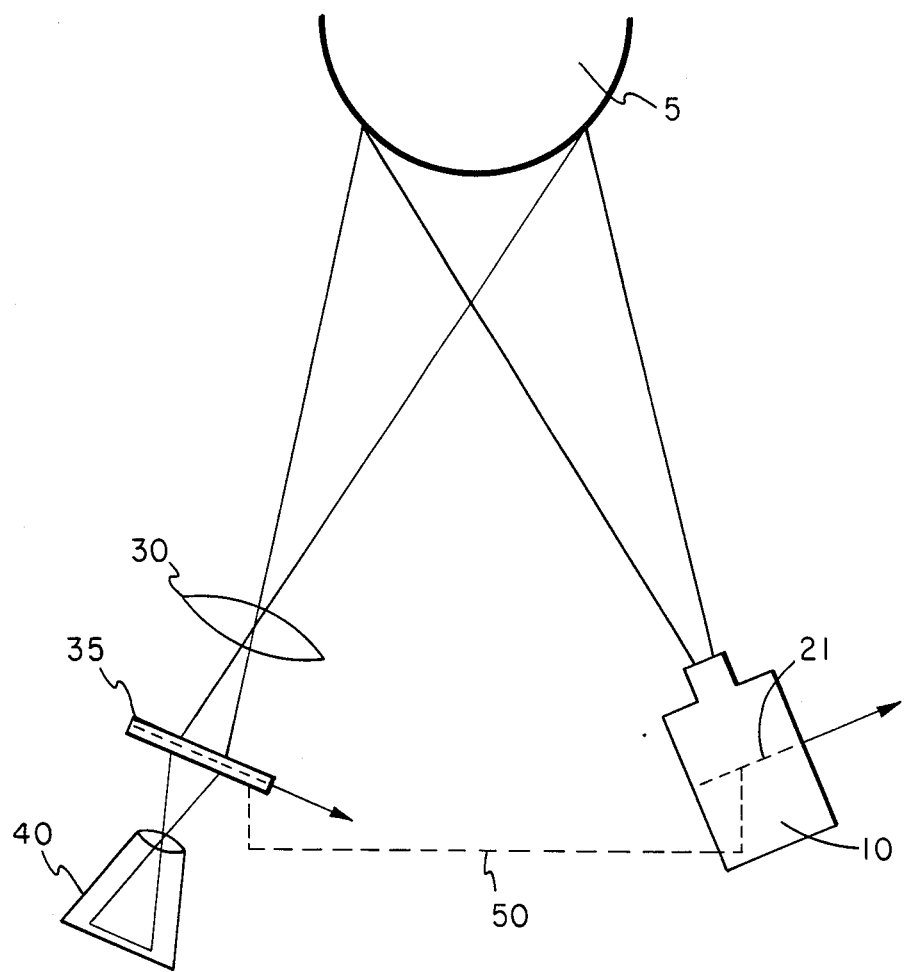
FIG. 1 is a block diagram, partially in schematic form, of an apparatus in accordance with an embodiment of the invention, and which can be used to practice the method of the invention.

The principle of operation of the projection moire technique hereof with moving gratings can be initially understood with the aid of FIG. 1. A moving projection grating in a projector 10 is translated in its plane at a constant velocity. The deformed moving grating projected on a 3-dimensional object 5 is imaged by an imaging lens 30 onto the reference plane at which a reference grating 35 is simultaneously translated, also at a constant velocity. For a given geometry the two velocities can be synchronized in the direct ratio of the grating frequencies, as represented by dashed line 50, such that the fringe pattern generated at the image plane remains stationary. A lack of synchronization produces a motion of the fringes. Once the translations are fully synchronized, a long exposure photographic recording of the image plane, such as with the aid of a camera 40, will reveal clear moire fringes, and the individual moving grating lines are removed in the photographic analog integration process. [The camera may alternatively be a video camera, in conjunction, for example, with suitable electronic means for accumulating the images during motion of the gratings.]In addition, any spurious or secondary moire is removed, and pitch errors and local imperfections are averaged out, revealing only the true contouring fringes. [The term spurious moire, as used herein, refers to the moire of interference between the fine fringes in the regions of large slope and the coarse projected grating on the object, as seen at the image plane. On the other hand, the term secondary moire refers to the interference of the reference grating and the fine projected grating lines with imaged frequency of nearly two or more times the frequency of the reference grating, also at the image plane.]It is thus possible to obtain fringe densities much higher than the grating frequency. These fringes would otherwise be obscured.

The nature and extent of improvement obtainable is illustrated in FIG. 2. FIG. 2A illustrates stationary grating fringes obtained from a projection moire setup with a mannequin object, and FIG. 2B illustrates the same setup with moving gratings.

Figure 3:
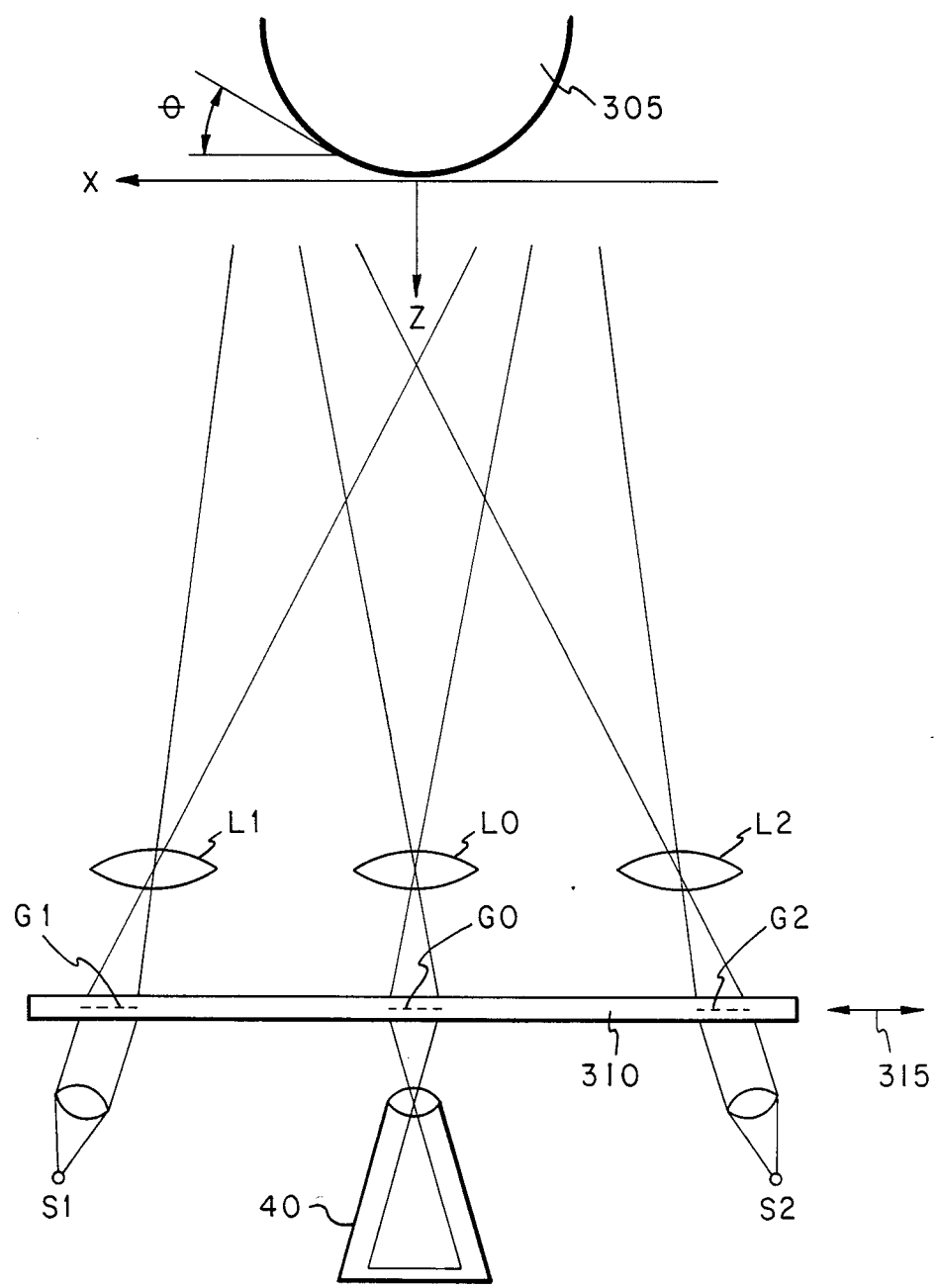
FIG. 3 is a block diagram, partially in schematic form, of another embodiment of an apparatus in accordance with the invention and which can be used to practice the method of the invention.

The arrangement of FIG. 1 shows two independant translation stages and can be improved in simplicity and ease of control by mounting both gratings in a common movable member. Also, in a single projection scheme, the object illumination may not be uniform and parts of the surface may not be contoured due to shadows. Referring to FIG. 3, there is shown an embodiment of the invention in a double projection system wherein two non-coherent projection light sources S1 and S2 illuminate identical gratings G1 and G2. These gratings are projected onto the 3-D object 305 via lenses L1 and L2. The projected gratings are then imaged through the lens L0 onto a third, reference grating G0 that has the same pitch and orientation as G1 and G2. All three gratings are mounted on a single rigid bar 310 that is translatable, as represented by double-headed arrow 315. This arrangement produces two identical overlapping fringe patterns of the multiplicative-type moire in the plane of G0. Careful alignment of the individual gratings for symmetry, orientation and parallelism is necessary to assure coincidence of the two fringe patterns. A translation of the gratings, not necessarily with uniform velocity, during photographic recording produces a high contrast, noiseless and shadow-free fringe pattern.

A typical result obtained with this arrangement is illustrated in FIG. 4 for the mannequin face. The moving grating projection moire method can be seen to enhance the visibility and definition of the contouring fringes even in the regions of large depths and slopes. Comparing the result with FIG. 2B, it is seen that the shadows are effectively reduced due to double projection.

Figure 5:
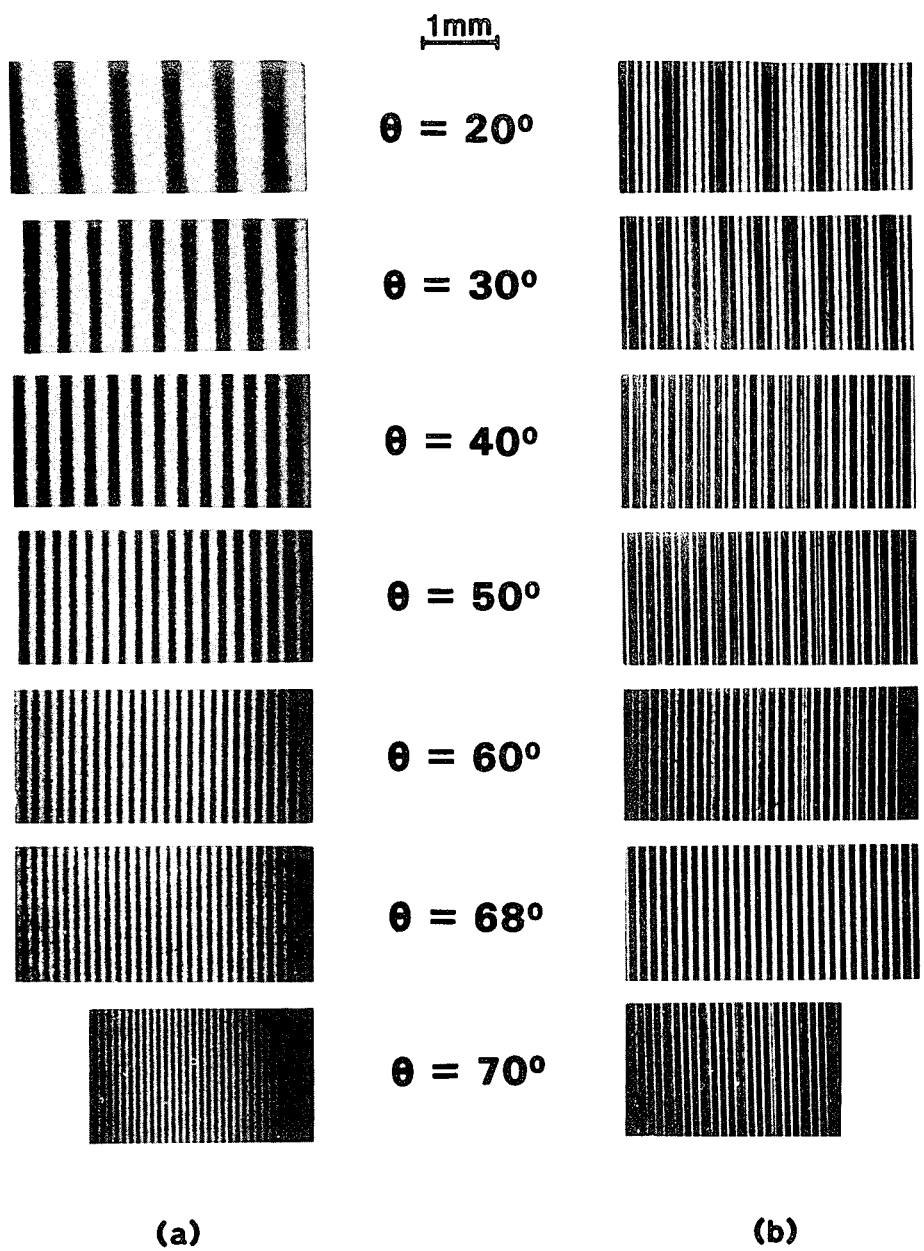
FIG. 5 shows fringe patterns obtained with the apparatus of FIG. 3 for different inclination angles of a plane rectangular surface.

A plane rectangular surface was selected as a test object for quantitatively studying the capability of the moving grating projection method in terms of depth of contouring and resolution of fringes in the image plane. The plane was used with several successive inclinations $\theta$ to the x-direction (see FIG. 3). The corresponding fringe patterns are shown in FIG. 5. A comparison of the fringe patterns using the moving gratings (column (a)) with the stationary grating fringe patterns (column (b)) shows the degree of improvement. The 1 mm mark in the figure refers to the dimension on the image plane of G0, and the moire depth sensitivity for the test arrangement was $\Delta Z = 6$ mm. High definition fringes were obtained for angles up to $\theta = 85°$. It may be noted that for $\theta = 68°$ the fringe frequency and the grating frequency are identical, and that the fringes with frequencies higher than the grating frequency are also clearly recorded.

I claim:

1. Apparatus for obtaining a moire fringe pattern images of an object, comprising:
   means for projecting a beam of radiation at the object;
   a movable projection grating disposed in said projecting means in the path of the beam projected at the object;
   means for focusing the beam reflected from the object to obtain an image at an image plane;
   a movable reference grating disposed at the image plane;
   means for recording the image at the image plane; and
   means for moving said gratings in synchronism.

2. Apparatus as defined by claim 1, wherein said means for moving said gratings in synchronism comprises a movable member in which said gratings are mounted in spaced relation.

3. Apparatus as defined by claim 1, wherein said recording means is operative to accumulate the recorded image during the motion of the gratings.

4. Apparatus as defined by claim 2, wherein said recording means is operative to accumulate the recorded image during the motion of the gratings.

5. Apparatus as defined by claim 3, wherein said recording means comprises a photographic camera.

6. Apparatus as defined by claim 3, wherein said recording means comprises a video camera.

7. Apparatus as defined by claim 1, wherein said radiation is incoherent light.

8. Apparatus for obtaining a moire fringe pattern image of an object, comprising:
   first and second projection means for respectively projecting first and second beams of radiation at the object;
   first and second movable projection gratings respectively disposed in said first and second projection means in the paths of the first and second beams projected at the object;
   means for focusing the beams reflected from the object to obtain an image at an image plane;
   a movable reference grating disposed at the image plane;
   means for recording the image at the image plane; and
   means for moving said projection gratings and said reference grating in synchronism.

9. Apparatus as defined by claim 8 wherein said means for moving said gratings in synchronism comprises a movable member in which said gratings are mounted in spaced relation.

10. Apparatus as defined by claim 8, wherein said recording means is operative to accumulate the recorded image during the motion of the gratings.

11. Apparatus as defined by claim 9, wherein said recording means is operative to accumulate the recorded image during the motion of the gratings.

12. Apparatus as defined by claim 10, wherein said recording means comprises a photographic camera.

13. Apparatus as defined by claim 10, wherein said recording means comprises a video camera.

14. Apparatus as defined by claim 10, wherein said radiation is incoherent light.

15. A method for obtaining a moire fringe pattern of an object, comprising the steps of:
projecting a beam of radiation at the object;
disposing a movable projecting grating in the projecting source and in the path of the beam projected at the object;
focusing the beam reflected from the object to obtain an image at an image plane;
disposing a movable reference grating at the image plane;
moving the gratings in synchronism; and
recording the image at the image plane during synchronized motion of the gratings.

16. The method as defined by claim 15; wherein said step of moving said gratings in synchronism comprises moving a member having spaced gratings therein.

17. The method as defined by claim 15, wherein said radiation is incoherent light.

18. A method for obtaining a moire fringe pattern of an object, comprising the steps of:
projecting first and second beams of radiation at the object;
disposing first and second projection gratings in the projection sources of the first and second beams, respectively;
focusing the beams reflected from the object to obtain an image at an image plane;
disposing a movable referable grating at the image plane;
moving the projecting gratings and the image grating in synchronism; and
recording the image at the image plane during synchronized motion of the gratings.

19. The method as defined by claim 18, wherein said step of moving said gratings in synchronism comprises moving a member having spaced gratings therein.

20. The method as defined by claim 18, wherein said radiation is incoherent light.

* * * * *